(12) United States Patent  
Takashiro

(10) Patent No.: US 9,112,195 B2
(45) Date of Patent: Aug. 18, 2015

(54) SEALED BATTERY

(71) Applicant: Shigeru Takashiro, Toyota (JP)

(72) Inventor: Shigeru Takashiro, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 36 days.

(21) Appl. No.: 14/027,551

(22) Filed: Sep. 16, 2013

(65) Prior Publication Data

US 2014/0087242 A1  Mar. 27, 2014

(30) Foreign Application Priority Data

Sep. 27, 2012 (JP) ................................. 2012-214965

(51) Int. Cl.
| H01M 2/08 | (2006.01) |
|---|---|
| H01M 2/04 | (2006.01) |
| H01M 2/34 | (2006.01) |
| H01M 2/22 | (2006.01) |
| H01M 2/26 | (2006.01) |
| H01M 10/0525 | (2010.01) |

(52) U.S. Cl.
CPC .............. *H01M 2/0408* (2013.01); *H01M 2/08* (2013.01); *H01M 2/345* (2013.01); *H01M 2/043* (2013.01); *H01M 2/22* (2013.01); *H01M 2/266* (2013.01); *H01M 10/0525* (2013.01); *Y02T 10/7011* (2013.01)

(58) Field of Classification Search
CPC .......... H01M 10/0525; H01M 2/0408; H01M 2/043; H01M 2/08; H01M 2/22; H01M 2/266; H01M 2/345

USPC ............ 429/89, 121, 163, 171, 175, 180, 181
See application file for complete search history.

(56) References Cited

U.S. PATENT DOCUMENTS

| 2003/0194609 A1 | 10/2003 | Nam et al. |
| 2008/0038627 A1 | 2/2008 | Yamauchi et al. |
| 2013/0196220 A1 | 8/2013 | Okutani et al. |

FOREIGN PATENT DOCUMENTS

| JP | 2000-113865 A | * | 4/2000 | .............. H01M 2/04 |
|---|---|---|---|---|
| JP | A-2000-113865 | | 4/2000 | |
| JP | A-2003-317678 | | 11/2003 | |
| JP | A-2006-216411 | | 8/2006 | |
| JP | A-2008-66254 | | 3/2008 | |
| JP | A-2013-175428 | | 9/2013 | |
| JP | A-2013-225500 | | 10/2013 | |

* cited by examiner

*Primary Examiner* — Patrick Ryan
*Assistant Examiner* — Ben Lewis
(74) *Attorney, Agent, or Firm* — Oliff PLC

(57) ABSTRACT

A sealed battery includes a battery case within which an electrode body is housed; a lid that joins to an open portion of the battery case; a conducting member that is inserted through the lid and that electrically connects the electrode body to an external terminal provided on the lid; and an insulating plate that is interposed between the lid and the conducting member, and that insulates the lid from the conducting member. A protruding portion is formed, in a position able to be visually recognized from outside while the insulating plate is in a state tightly fixed between the lid and the conducting member, on at least one of an abutting surface of the insulating plate that abuts against the lid, and an abutting surface of the insulating plate that abuts against the conducting member.

4 Claims, 3 Drawing Sheets

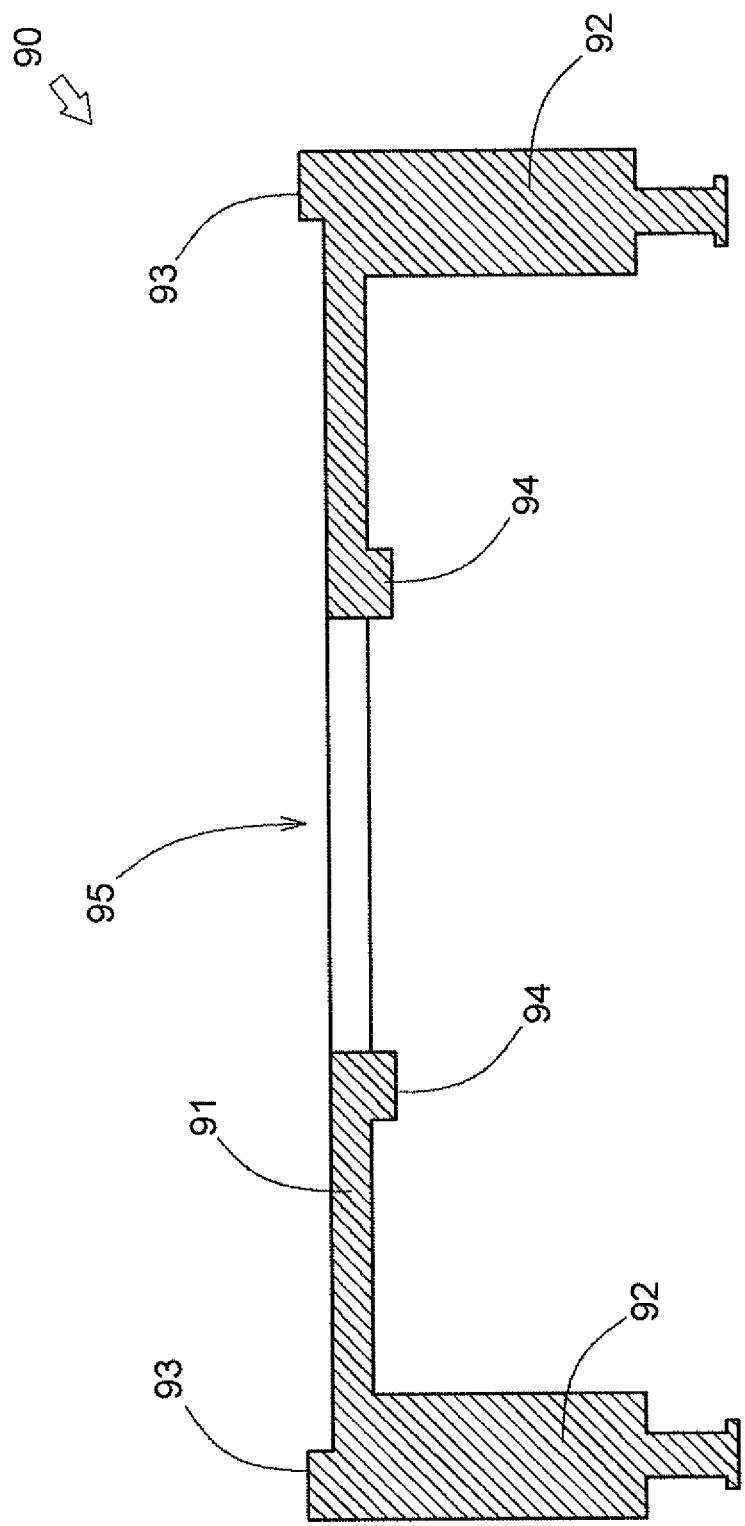

SEALED BATTERY

INCORPORATION BY REFERENCE

The disclosure of Japanese Patent Application No. 2012-214965 filed on Sep. 27, 2012 including the specification, drawings and abstract is incorporated herein by reference in its entirety.

BACKGROUND OF THE INVENTION

1. Field of the Invention

The invention relates to technology of a sealed battery.

2. Description of Related Art

Sealed batteries, such as non-aqueous electrolyte secondary batteries, for example, are well known. In recent years, non-aqueous electrolyte secondary batteries have become increasingly important as onboard power supplies mounted in vehicles such as electric vehicles, or power supplies in personal computers, mobile terminals, and other electrical products.

For example, a non-aqueous electrolyte secondary battery described in Japanese Patent Application Publication No. 2008-066254 (JP 2008-066254 A) includes a battery case within which an electrode body is housed, a lid that joins to an open portion of the battery case, and a conducting member that is inserted through the lid and conducts current between the electrode body and an external terminal. With this kind of non-aqueous electrolyte secondary battery, the lid and the conducting member are made of metal and have conductivity, so an insulating plate is tightly fixed between the lid and the conducting member, so as to insulate the lid from the conducting member.

Also, with this kind of non-aqueous electrolyte secondary battery, in order to tightly fix the insulating plate between the lid and the conducting member, the lid, the insulating plate, and the conducting member are fixed by crimping with a tool. However, currently, it is not possible to confirm whether the insulating plate is tightly fixed between the lid and the conducting member after the lid, the insulating plate, and the conducting member have been fixed by crimping with the tool.

Moreover, in some cases with this kind of non-aqueous electrolyte secondary battery, an insulating plate and a gasket are tightly fixed between the lid and the conducting member in order to ensure the sealing characteristics of the battery case. In such cases, a gap is formed between the lid and the conducting member due to reaction force of the gasket, so the contact between the lid and the insulating plate, as well as the contact between the insulating plate and the conducting member, deteriorates.

The invention thus provides a sealed battery that improves the contact between the lid and the insulating plate, as well as the contact between the insulating plate and the conducting member, and in which it is possible to confirm whether the insulating plate is tightly fixed between the lid and the conducting member.

SUMMARY OF THE INVENTION

One aspect of the invention relates to a sealed battery that includes a battery case within which an electrode body is housed; a lid that joins to an open portion of the battery case; a conducting member that is inserted through the lid and that electrically connects the electrode body to an external terminal provided on the lid; and an insulating plate that is interposed between the lid and the conducting member, and that insulates the lid from the conducting member. A protruding portion is formed, in a position able to be visually recognized from outside while the insulating plate is in a state tightly fixed between the lid and the conducting member, on at least one of an abutting surface of the insulating plate that abuts against the lid, and an abutting surface of the insulating plate that abuts against the conducting member.

In the sealed battery according to the aspect of the invention described above, the protruding portion may be formed on an outer peripheral side edge portion of the insulating plate.

With the sealed battery according to the aspect of the example embodiment described above, it is possible to improve the contact between the lid and the insulating plate, as well as the contact between the insulating plate and the conducting member, and confirm whether the insulating plate is tightly fixed between the lid and the conducting member.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 3 is a view showing a frame format of an insulating plate.

DETAILED DESCRIPTION OF EMBODIMENTS

Figure 1:
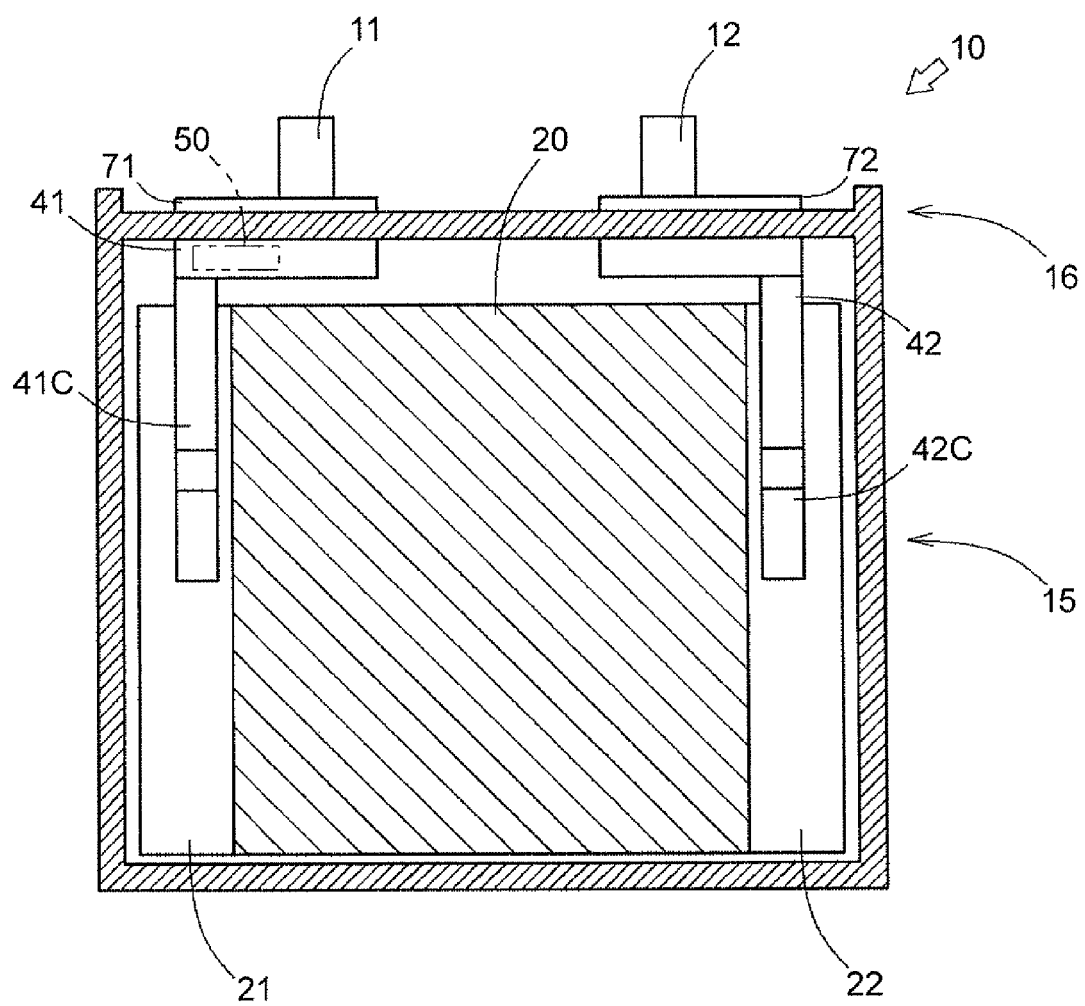
FIG. 1 is a view showing a frame format of a lithium-ion battery.

A lithium-ion secondary battery 10 will be described with reference to FIG. 1. FIG. 1 is a sectional view showing a frame format of the lithium-ion secondary battery 10.

The lithium-ion secondary battery 10 is one example embodiment of the sealed battery of the invention. The lithium-ion secondary battery 10 includes a battery case 15, a lid 16, a positive terminal 11 as an external terminal, a negative terminal 12 as an external terminal, and a rolled electrode body 20 as a collector.

The battery case 15 is configured as a cuboid-shaped square case. The flat rolled electrode body 20 and an electrolyte are housed inside the battery case 15. The lid 16 is configured to block off an open portion that is open in an upper portion of the battery case 15. The positive terminal 11 and the negative terminal 12 that are for external connection are provided on the lid 16. A portion of both the positive terminal 11 and the negative terminal 12 protrudes on the surface side of the lid 16.

A positive collector 21 is exposed on an end portion on one side, in a width direction, of the rolled electrode body 20 that serves as a collector. Meanwhile, a negative collector 22 is exposed on an end portion on the other side, in the width direction, of the rolled electrode body 20 that serves as a collector.

A leg portion 41C of a positive collector plate 41 is joined to the positive collector 21. Meanwhile, a leg portion 42C of a negative collector plate 42 is joined to the negative collector 22. The positive collector plate 41 is a member for electrically connecting the positive collector 21 of the rolled electrode body 20 to the positive terminal 11, and is also used as a component of a current interrupting device 50. The negative collector plate 42 is a member for electrically connecting the negative collector 22 of the rolled electrode body 20 to the negative terminal 12.

The positive terminal 11 that serves as an external terminal is electrically connected to the positive collector 21 of the rolled electrode body 20 via a Z terminal 71, the current interrupting device 50, and the positive collector plate 41. The negative terminal 12 that serves as an external terminal is electrically connected to the negative collector 22 of the rolled electrode body 20 via a Z terminal 72 and the negative collector plate 42.

Figure 2:
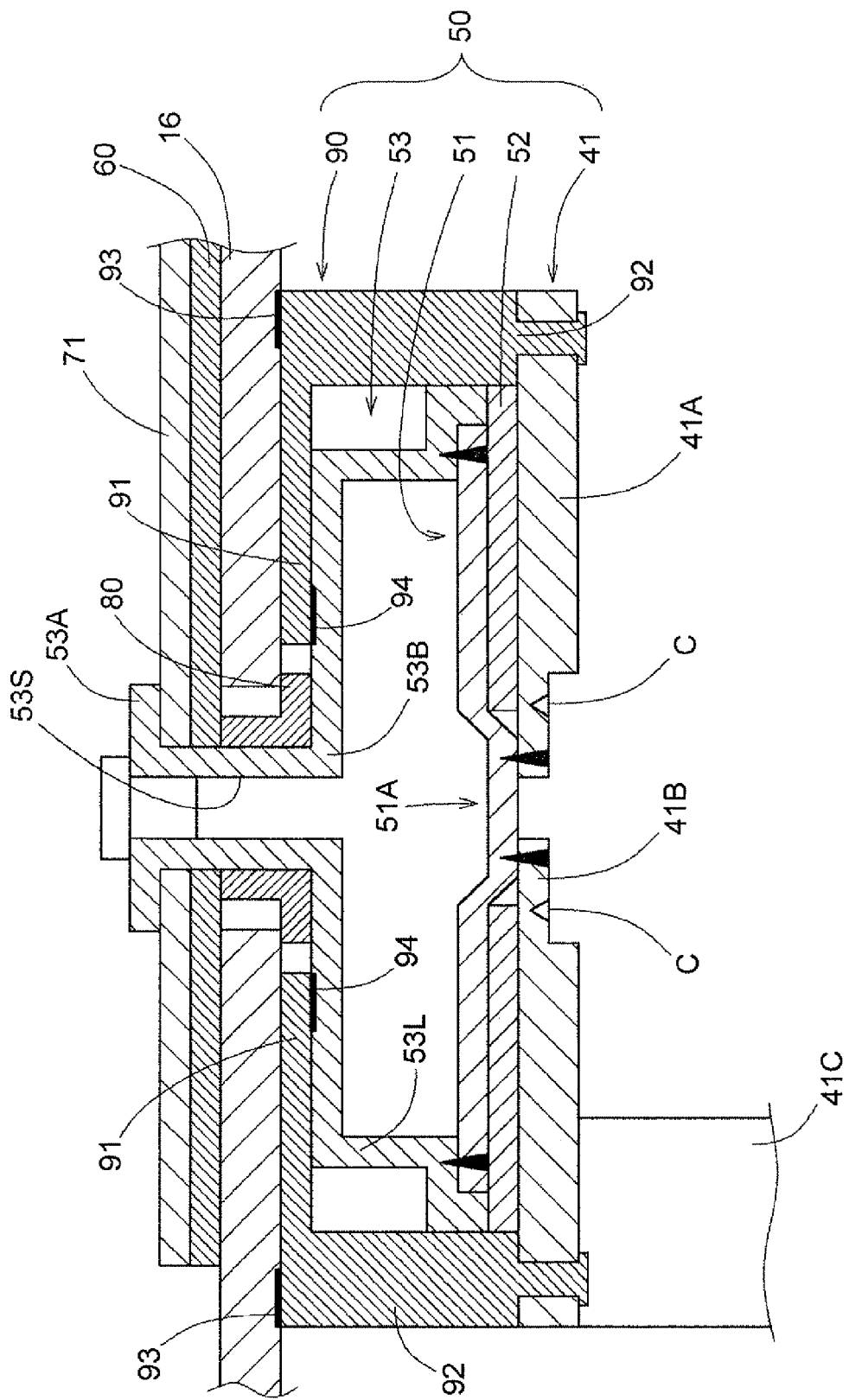
FIG. 2 is a view showing a frame format of a current interrupting device.

The structure of the current interrupting device 50 will now be described with reference to FIG. 2. FIG. 2 is a sectional view showing a frame format of the current interrupting device 50. Also, in FIG. 2, first protruding portions 93 and second protruding portions 94, both of which will be described later, are shown in a plastic deformed state.

The current interrupting device 50 is a device that interrupts the flow of current when pressure within the battery case 15 of the lithium-ion secondary battery 10 becomes higher than a set pressure. In this example embodiment, the current interrupting device 50 is provided on the positive electrode side of the lithium-ion secondary battery 10, but it may also be provided on the negative electrode side.

The current interrupting device 50 includes a reversing plate 51, a seal member 52, a rivet 53 that serves as a conducting member, an insulating plate 90, and the positive collector plate 41.

The rivet 53 as the conducting member is made of copper, and has two generally cylindrical portions, i.e., a small diameter portion 53S and a large diameter portion 53L. The rivet 53 has three functions, the first of which is to tightly fix the lid 16 and the like, the second of which is to electrically connect the Z terminal 71 to the positive collector plate 41, and the third of which is to form a space for the reversing plate 51 to reverse.

With the small diameter portion 53S of the rivet 53, the Z terminal 71, an upper gasket 60, a lower gasket 80, the lid 16, and the insulating plate 90 are all tightly fixed between an upper end edge portion 53A and a large diameter edge portion 53B. The space for the reversing plate 51 to reverse is formed inside of the large diameter portion 53L of the rivet 53. The reversing plate 51 is fixed by welding to a lower end portion of the large diameter portion 53L of the rivet 53.

The Z terminal 71 is made of copper, and electrically connects the positive terminal 11 (see FIG. 1) to the rivet 53. An open portion is formed in the Z terminal 71, and the rivet 53 is inserted through this open portion.

The upper gasket 60 is made of resin, and insulates the Z terminal 71 from the lid 16. An open portion is formed in the upper gasket 60, and the rivet 53 is inserted through this open portion.

The lid 16 is made of aluminum, and blocks off the open portion that is open in the upper portion of the battery case 15, as described above (see FIG. 1). An open portion is formed in the lid 16, and the rivet 53 is inserted through this open portion.

The lower gasket 80 is made of resin, and insulates the rivet 53 from the lid 16, just like the insulating plate 90 that will be described later. The lower gasket 80 is arranged between the lid 16 and the rivet 53.

The insulating plate 90 is made of resin, and insulates the rivet 53 from the lid 16. The insulating plate 90 is interposed between the rivet 53 and the lid 16. The insulating plate 90 includes a main body 91, leg portions 92, first protruding portions 93, second protruding portions 94, and an open portion 95. The insulating plate 90 will be described in detail later.

The reversing plate 51 is made of copper, and is formed in a discoid shape. A recessed portion 51A that is a portion in which the upper side is recessed, is formed in generally the center portion of the reversing plate 51. An edge portion around the reversing plate 51 is joined to a lower end portion of the large diameter portion 53L of the rivet 53 by welding. The joint between the reversing plate 51 and the rivet 53 is welded all around.

The seal member 52 is made of rubber, and is formed in a generally discoid shape with a hole formed in substantially the center portion. The seal member 52 is arranged compressed between the reversing plate 51 and the positive collector plate 41.

The positive collector plate 41 is made of copper, and electrically connects the positive collector 21 of the rolled electrode body 20 to the reversing plate 51. The positive collector plate 41 includes a main body 41A, a connecting portion 41B, and a leg portion 41C.

The main body 41A is formed in a discoid shape, and is tightly fixed on both sides thereof to the leg portions 92 of the insulating plate 90.

The connecting portion 41B is a portion on an inner peripheral side of a slit C formed in a circular shape that is formed in generally the center portion of the main body 41A. The thickness of the connecting portion 41B and the portion of the main body 41A in which the slit C is formed, is formed thinner than the thickness of any other portion of the main body 41A. A hole is formed in the center portion of the connecting portion 41B. The connecting portion 41B is joined by welding to the reversing plate 51.

The leg portion 41C extends downward from the main body 41A, and is joined to the positive collector 21 of the rolled electrode body 20 by welding.

The state of the current interrupting device 50 shown in FIG. 2 is a normal state (i.e., a state in which the current interrupting device 50 is not activated), with the positive terminal 11, the Z terminal 71, the rivet 53, the reversing plate 51, and the positive collector plate 41 electrically connected together.

However, when the pressure inside the battery case 15 becomes higher than a set pressure, pressure is applied from the inside to the recessed portion 51A of the reversing plate 51 that is connected to the connecting portion 41B of the positive collector plate 41, and as a result, the portion of the positive collector plate 41 with the slit C breaks and the reversing plate 51 deforms outward. That is, the current interrupting device 50 activates. As a result, the positive collector plate 41 becomes electrically cut off (i.e., disconnected) from the reversing plate 51.

Next, the structure of the insulating plate 90 will be described with reference to FIGS. 2 and 3. FIG. 3 is a sectional view showing a frame format of the insulating plate 90 before it is assembled to the current interrupting device 50.

The insulating plate 90 is made of resin, and insulates the rivet 53 from the lid 16, as described above. The insulating plate 90 includes the main body 91, the leg portions 92, the first protruding portions 93, the second protruding portions 94, and the open portion 95. The first protruding portions 93 and the second protruding portions 94 are formed on the main body 91.

The main body 91 is formed in a generally discoid shape with the circular open portion 95 formed in substantially the center. The main body 91 is arranged between the lid 16 and the rivet 53.

The leg portions 92 are formed protruding downward from both ends of the main body 91. A tip end portion of each of the two leg portions 92 is fixed to the positive collector plate 41. The large diameter portion 53L of the rivet 53, the reversing plate 51, and the seal member 52 are interposed between the positive collector plate 41 and the main body 91. The current interrupting device 50 is fixed to the lid 16 by the insulating plate 90.

The first protruding portions 93 are formed by a portion of an outside surface of an outer peripheral edge portion of the main body 91 protruding toward the outside (i.e., upward in FIG. 2). The first protruding portions 93 of this example embodiment are each formed in a rectangular shape in a sectional view. The protruding height of the first protruding portions 93 is sufficiently smaller than the thickness of the main body 91.

The second protruding portions 94 are formed by a portion of an inside surface of an inner peripheral edge portion (i.e., the edge portion on the open portion 95 side) of the main body 91 protruding toward the inside (i.e., downward in FIG. 2). The second protruding portions 94 of the invention are each formed in a rectangular shape in a sectional view. The protruding height of the second protruding portions 94 is sufficiently smaller than the thickness of the main body 91.

Next, the operation of the insulating plate 90 will be described with reference to FIGS. 2 and 3. In the manufacturing process of the lithium-ion secondary battery 10, the Z terminal 71, the upper gasket 60, the lower gasket 80, the lid 16, and the insulating plate 90 are all sandwiched between the upper end edge portion 53A and the large diameter edge portion 53B of the rivet 53, and tightly fixed (i.e., crimped) with a tool.

At this time, the first protruding portions 93 are formed protruding upward, so when the lid 16 and the insulating plate 90 are crimped together, the first protruding portions 93 that are made of resin are pressed against the lid 16 that is made of aluminum, and plastic deform (see FIG. 2). When the first protruding portions 93 plastic deform against the lid 16, the first protruding portions 93 consequently become crimped to the lid 16, such that the insulating plate 90 and the lid 16 are fixed together via the plastic deformed first protruding portions 93. As a result, the insulating plate 90 is in reliably close contact with the lid 16.

Also, the first protruding portions 93 are formed on the outer peripheral edge side of the insulating plate 90, so when the lid 16 and the insulating plate 90 are crimped together, the plastic deformed first protruding portions 93 are able to be visually checked from the outside.

At the same time, the second protruding portions 94 are formed protruding downward, so when the insulating plate 90 and the rivet 53 are crimped together, the second protruding portions 94 that are made of resin are pressed against the rivet 53 that is made of copper and plastic deform (see FIG. 2). When the second protruding portions 94 plastic deform against the rivet 53, the second protruding portions 94 consequently become crimped to the rivet 53, such that the insulating plate 90 and the rivet 53 are fixed together via the plastic deformed second protruding portions 94. As a result, the insulating plate 90 is in reliably close contact with the rivet 53.

Next, the effects of the lithium-ion secondary battery 10 will be described. According to the lithium-ion secondary battery 10, it is possible to improve the contact between the lid 16 and the insulating plate 90, as well as the contact between the insulating plate 90 and the rivet 53, and confirm whether the insulating plate 90 is tightly fixed between the lid 16 and the rivet 53.

The first protruding portions 93 and the second protruding portions 94 of this example embodiment are formed in rectangular shapes in a sectional view, but the invention is not limited to this. For example, the first protruding portions 93 or the second protruding portions 94 may alternatively be formed in circular shapes or triangular shapes in a sectional view.

What is claimed is:

1. A sealed battery comprising:
a battery case within which an electrode body is housed;
a lid that joins to an open portion of the battery case;
a conducting member that is inserted through the lid and that electrically connects the electrode body to an external terminal provided on the lid; and
an insulating plate that is interposed between the lid and the conducting member, and that insulates the lid from the conducting member, wherein
a first protruding portion and a second protruding portion are each formed in a position able to be visually recognized from outside while the insulating plate is in a state tightly fixed between the lid and the conducting member, the first protruding portion being formed on an abutting surface of the insulating plate that abuts against the lid, and the second protruding portion being formed on an abutting surface of the insulating plate that abuts against the conducting member; and
the second protruding portion is pressed against the conducting member and plastically deforms such that the second protruding portion is crimped to the conducting member, while the insulating plate and the conducting member are in a state crimped together.

2. The sealed battery according to claim 1, wherein:
the first protruding portion is pressed against the lid and plastically deforms such that the first protruding portion is crimped to the lid, while the insulating plate and the lid are in a state crimped together.

3. The sealed battery according to claim 1, wherein:
the first protruding portion is formed on an outer peripheral side edge portion of the insulating plate.

4. The sealed battery according to claim 1, wherein:
the second protruding portion is formed on an inner peripheral side edge portion of the insulating plate.

* * * * *